United States Patent
Klefsjo et al.

(10) Patent No.: US 10,154,380 B2
(45) Date of Patent: Dec. 11, 2018

(54) METHOD AND SYSTEM FOR HANDLING POSITION OF A UE ASSOCIATED WITH A VEHICLE

(71) Applicant: VOLVO CAR CORPORATION, Gothenburg (SE)

(72) Inventors: Christian Klefsjo, Gothenburg (SE); Simon Rudh, Ravlanda (SE); Sheng Xu, Molndal (SE); Alistair MacLean, Stenungsund (SE); Farid Abedan Kondori, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/952,383

(22) Filed: Apr. 13, 2018

(65) Prior Publication Data
US 2018/0310131 A1    Oct. 25, 2018

(30) Foreign Application Priority Data

Apr. 20, 2017 (EP) .................................. 17167247

(51) Int. Cl.
*H04W 4/02* (2018.01)
*H04W 4/04* (2009.01)
*H04W 64/00* (2009.01)

(52) U.S. Cl.
CPC .................................. *H04W 4/023* (2013.01)

(58) Field of Classification Search
CPC ....... H04W 64/00; H04W 4/023; H04W 4/04; H04W 4/029; H04W 64/003
USPC ........................................................ 455/456.1
See application file for complete search history.

(56) References Cited

U.S. PATENT DOCUMENTS

| 2012/0015690 A1* | 1/2012 | Miao ................. H04M 1/72577 455/556.1 |
| 2015/0061856 A1 | 3/2015 | Raman et al. |

FOREIGN PATENT DOCUMENTS

| WO | 2012115649 A1 | 8/2012 |
| WO | 2016050280 A1 | 4/2016 |

OTHER PUBLICATIONS

Extended European Search Report for European Application No. 17167247.0, completed by the European Patent Office, dated Oct. 23, 2017, 5 pages.

* cited by examiner

*Primary Examiner* — Marisol Figueroa
(74) *Attorney, Agent, or Firm* — Brooks Kushman P.C.

(57) ABSTRACT

A method performed by a system for handling a position of a User Equipment (UE) associated with a vehicle is described. The system obtains the UE position and a position of the vehicle, and compares the UE position with the vehicle position. The system determines a degree of match of the compared UE and vehicle positions, and informs a user of the UE of the degree of match.

14 Claims, 6 Drawing Sheets

US 10,154,380 B2

METHOD AND SYSTEM FOR HANDLING POSITION OF A UE ASSOCIATED WITH A VEHICLE

CROSS-REFERENCE TO RELATED APPLICATIONS

This application claims foreign priority benefits under 35 U.S.C. § 119(a)-(d) to European patent application number EP 17167247.0, filed Apr. 20, 2017, which is incorporated by reference in its entirety.

TECHNICAL FIELD

Embodiments herein relate generally to a method performed by a vehicle, a system and a vehicle comprising the system. More particularly the embodiments herein relate to handling position of a User Equipment (UE) associated with the vehicle.

BACKGROUND

Mobile phones have become part of our daily life, and have changed the way we live, work, travel etc. They have made our life simpler, easier and more enjoyable. Our phones have become such a fixture in our daily life activities that we can sometimes feel naked without them. Therefore most people would find it difficult being without their phone. Whether you lose it at a bar or forget it at home when you leave for work, being without your phone can be a stressful and awkward experience. If you have ever lost your phone or had it stolen, you know how horrible it feels. You not only feel disconnected, you immediately start to think about all the valuable information on your phone that you cannot live without—pictures, text messages, contacts, notes, personal data and more. Nowadays phones are of great value for people, and losing phones is a major issue for people. Therefore, there is a need to at least mitigate or solve this issue.

SUMMARY

An objective of embodiments herein is therefore to obviate at least one of the above disadvantages and to provide improved handling of a UE associated with a vehicle.

According to a first non-limiting embodiment, the object is achieved by a method performed by system for handling position of a UE associated with a vehicle. The system obtains the UE's position and the vehicle's position, and compares the UE's position with the vehicle's position. The system determines a degree of match of the compared positions, and informs a user of the UE of the degree of match.

According to a second non-limiting embodiment, the object is achieved by a system for handling position of a UE associated with the vehicle. The system is configured to obtain the UE's position and the vehicle's position, and to compare the UE's position with the vehicle's position. The system is configured to determine a degree of match of the compared positions, and informs a user of the UE of the degree of match.

Thanks to comparing the UE's position with the vehicle's position, it is possible to determine and inform the user of the UE of the degree of match of the positions so that the user knows where its UE is located.

One advantage of the embodiments herein is that they enable vehicles to inform users where their UEs are, i.e. to reduce the risk of leaving behind, for instance forgetting, the UE inside or outside the vehicle.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
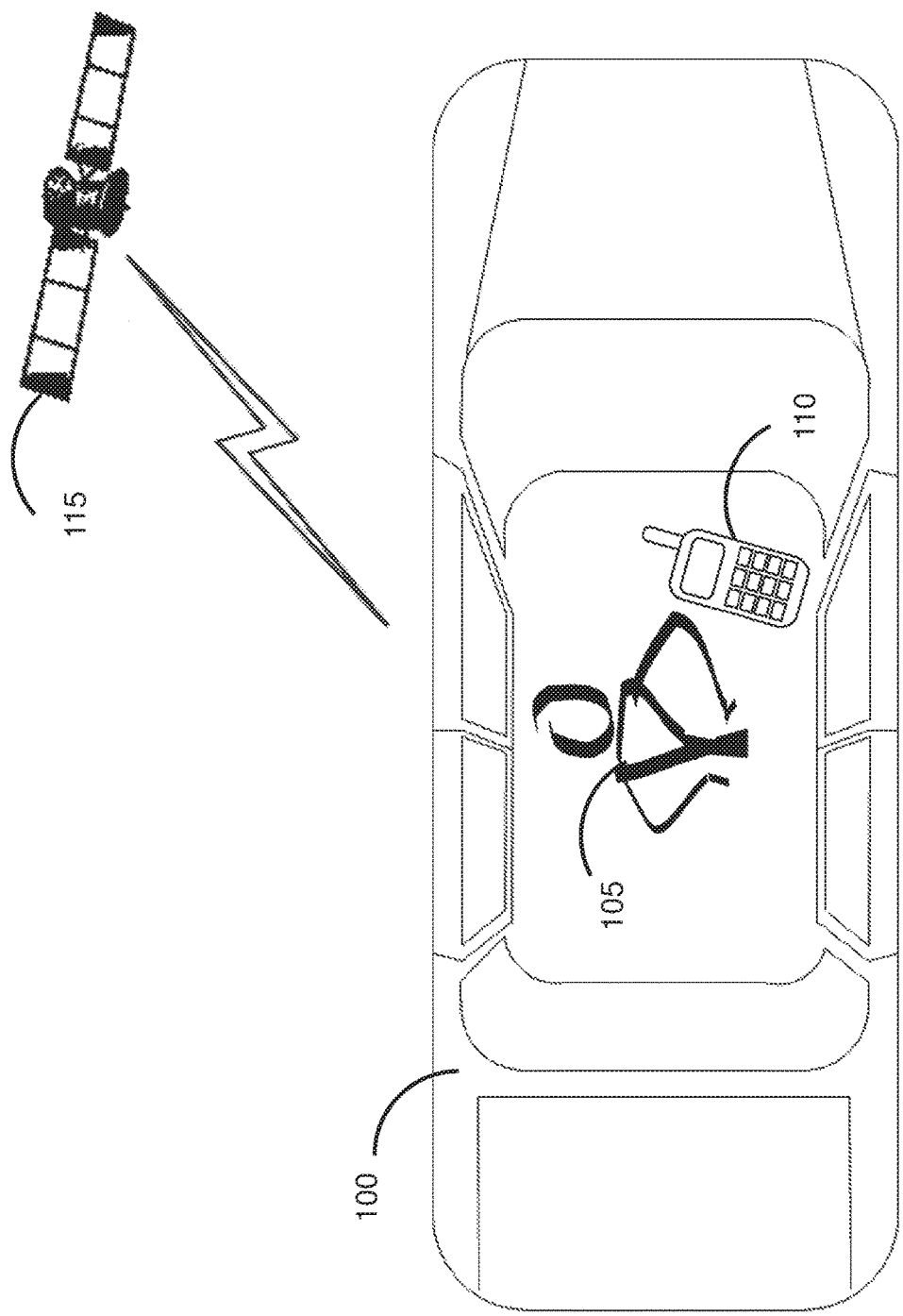
FIG. 1 illustrates a system.

FIG. 1 illustrates a system comprising a vehicle 100. The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous etc. A user 105 of a User Equipment (UE) 110 may be associated with the vehicle 100.

The user 105 may be the driver of the vehicle 100, it may be a passenger of the vehicle 100 or any other user of the UE 110 associated with the vehicle.

The UE 110 may be a device by which a subscriber may access services offered by an operator's network and services outside operator's network to which the operators radio access network and core network provide access, e.g. access to the Internet. The UE 110 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 110 may be portable, pocket storable, hand held, computer comprised, or vehicle mounted devices, enabled to communicate voice and/or data, via the radio access network, with another entity, such as another device or a server.

The UE 110 may also be associated with the vehicle 100 in that the UE 110 and the vehicle 100 are paired or linked to each other by establishing a connection between them. The connection may be a wireless or wired link. The connection may use any suitable protocol depending on type and level of layer (e.g. as indicated by the OSI model) as understood by the person skilled in the art. The pairing may be initiated from the UE 110 or the vehicle 100. The pairing between the UE 110 and the vehicle 100 may typically have to be performed once. After the initial pairing, the UE 110 and the vehicle 100 may automatically connect to each other when they are in range of each other and when a connecting device (e.g. a Bluetooth device) in each of the UE 110 and the vehicle 100 is enabled. The pairing may require that the user 105 has an identity (ID) which is associated with both the UE 110 and the vehicle 100.

The UE 110 may comprise a control system that enables the user 105 of the UE 110 and the vehicle 100 to remotely control the vehicle 100 via the UE 110. The control of the vehicle 100 may be for example to lock and unlock the vehicle 100, to control the climate system in the vehicle 100, to trace the vehicle 100, to remotely use the vehicle's infotainment system etc. The control system may be in the form of a computer program downloadable to the UE 110, e.g. a software application.

The vehicle 100 may comprise a vehicle communication system (e.g. referred to as an infotainment system). The vehicle communication system comprises for example a radio, a media player, it is adapted to communicate with the UE 110 and/or the user 105, and it can be adapted to connect to a communications network 115. (e.g. the Internet). The vehicle communication system may present information to the user 105 on a display comprised in the vehicle 100. The vehicle communication system may be operated by the user 105 using e.g. voice commands, by using a steering wheel keyboard, by using touch screen buttons integrated in the display or by using buttons in the center console of the vehicle 100.

The UE 110 and the vehicle 100 may both be connected to the communications network 115. The communications network 115 may also be referred to as e.g. a wireless communications network, a communications network, cellular network or a network. Nodes in the communications network 115 typically communicates over an air interface operating on radio frequencies with the UE 110 and the vehicle 100 in range of the network nodes. It should be noted that the communication links in the communications network may be of any suitable kind including either a wired or wireless link. The link may use any suitable protocol depending on type and level of layer (e.g. as indicated by the OSI model) as understood by the person skilled in the art.

At least the following two scenarios can be considered:

Scenario 1: When the user 105, e.g. the driver, turns the vehicle's engine on, and the vehicle 100 starts to move.

Scenario 2: When the user 105, e.g. the driver, locks vehicle's doors and leaves the vehicle 100.

In these scenarios, the user 105 is exemplified to be the driver of the vehicle, but they are equally applicable to scenarios where the user 105 is a passenger of the vehicle 100. These scenarios are explained in the following:

Scenario 1

Figure 2:
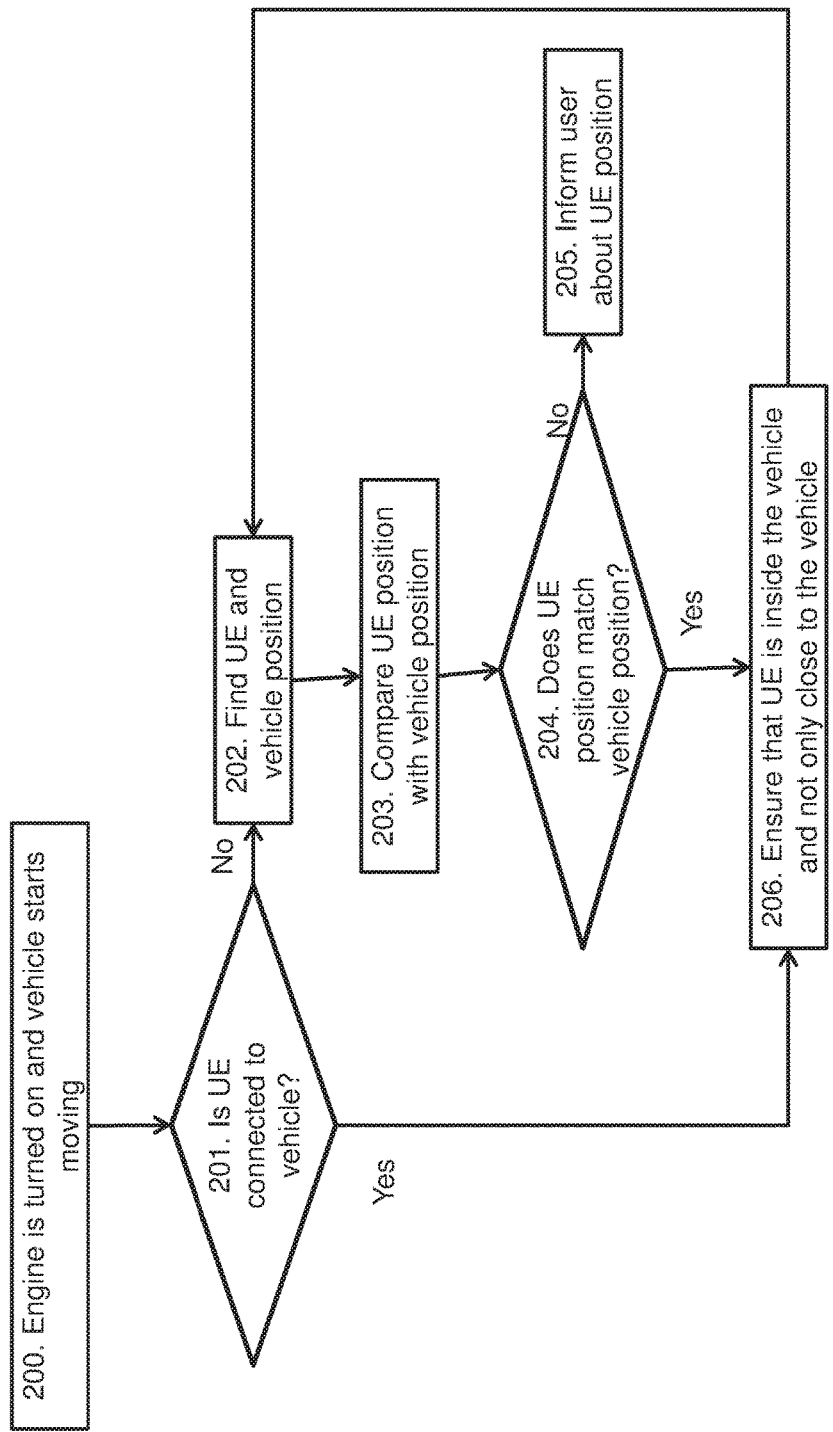
FIG. 2 is a flow chart illustrating an example scenario.

Scenario 1 is illustrated in FIG. 2 and comprises at least some of the following steps, which steps may be performed in any suitable order other than described below. The steps may be performed by the vehicle 100 or by a vehicle communication system comprised in the vehicle 100, e.g. an infotainment system.

Step 200

The user 105 turns the engine on, and the vehicle 100 starts to move.

Step 201

The connectivity between the vehicle 100 and the UE 110 is checked. The connectivity may be for example Bluetooth connectivity. The purpose of checking the connectivity is to determine if the UE 110 is connected to the vehicle 100.

If the UE 110 is not connected to the vehicle 100, indicated with "no" in FIG. 2, the method proceeds to step 202. If the UE 110 is connected to the vehicle 100, indicated with "yes" in FIG. 2, the method proceeds to step 206 to ensure that the UE 110 is inside the vehicle 100, and not only close to the vehicle 100.

Step 202

If the UE 110 is not connected to the vehicle 100, indicated with "no" in FIG. 2, the UE's 110 position and the vehicle's position are found. The terms location and position may be used interchangeably herein. In order to find the UE's 110 position, internet connectivity needs to be enabled in the vehicle 100, e.g. by using the vehicle communication system. The UE 110 can be localized by means of Global Positioning System (GPS), a Third Generation (3G) network, a Fourth Generation (4G) network, a Fifth Generation (5G) network, a WiFi network or any other suitable communication technology which enables communication. The position may be also be referred to as a location or a geographical position. For example, the vehicle 100 (which has enabled internet connectivity) sends a request via the communications network 115 for the UE's position. The request may comprise the UE's and the vehicle's IDs. The communication network 115 routes the request to the UE 110. The UE 110 sends a response back to the vehicle 100 via the communication network 115 with its position. The vehicle ID has previously been stored in the UE 110 (e.g. when paring the UE 110 with the vehicle 100), so by comparing the vehicle ID in the request and the previously stored vehicle ID, the UE 110 can ensure that the request comes from a secure vehicle, i.e. a vehicle from which it can trust communication.

Step 203

When the UE's and the vehicle's positions have been found in step 202, the UE's 110 and the vehicle's 100 positions are compared.

Step 204

In this step, it is checked whether or not the UE position and vehicle position match each other. If the positions match, indicated with "yes" in FIG. 2, the method proceeds to step 206. If there is a mismatch between the positions, indicated with "no" in FIG. 2, the method proceeds to step 205.

Step 205

This step is performed if there is a mismatch in the positions compared in step 203. A mismatch means that the UE 110 is not inside the vehicle 100, thus potentially is forgotten. When the mismatch is detected, the user 105 is informed about that the UE 110 is not inside the vehicle 100 and about the UE's position. The user 105 may be informed through a pop up message in the display in the vehicle communication system; additionally or alternatively, the user 105 may be informed audibly with support from one or more loudspeakers on-board the vehicle 100. The UE's position data may be for example in the form of GPS coordinates.

Step 206

This step is performed if the UE's position and the vehicle's position match. If the positions match, it needs to be ensured that the UE 110 is inside the vehicle 100, and not only close to the vehicle. This may be insured by going back to step 202 to find the UE's position again. So, while the vehicle 100 is moving, one or more additional position checks are performed to ensure presence of the UE 110 inside the vehicle 100.

Scenario 2

Figure 3:
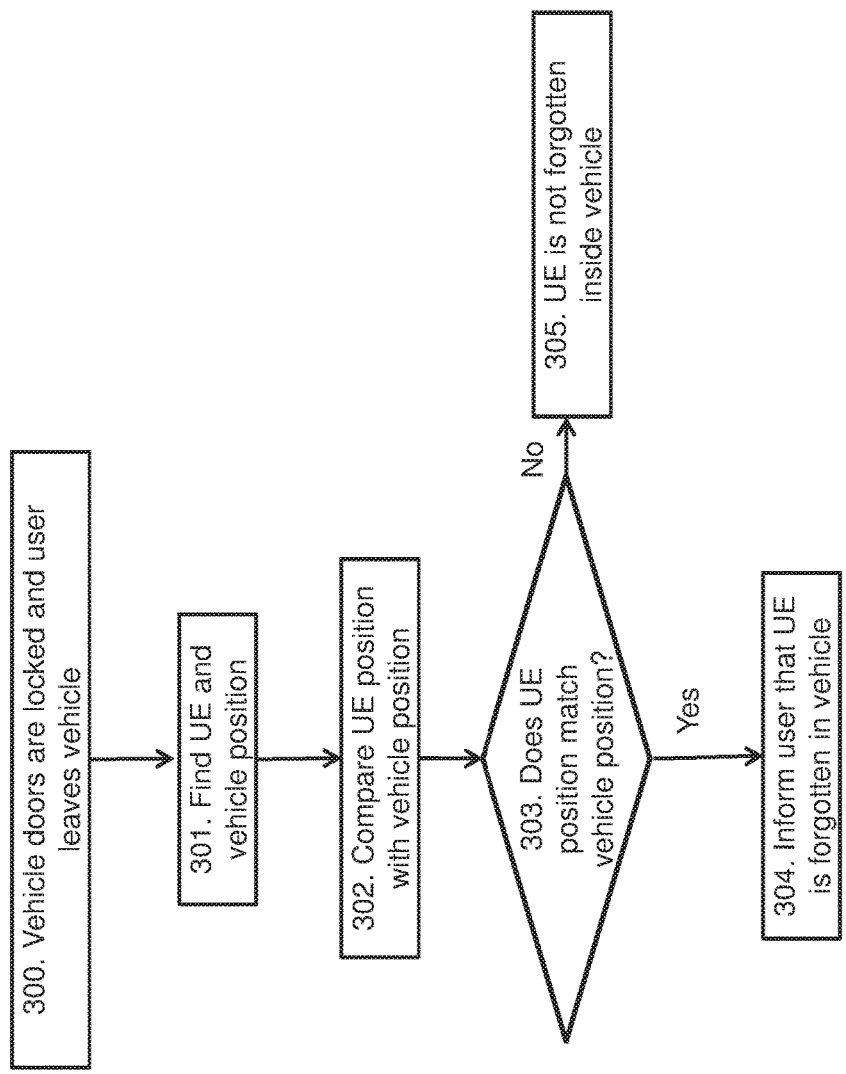
FIG. 3 is a flow chart illustrating an example scenario.

Scenario 2 is illustrated in FIG. 3 and comprises at least some of the following steps, which steps may be performed in any suitable order other than described below. The steps may be performed by the vehicle 100 or by a vehicle communication system comprised in the vehicle 100, e.g. an infotainment system.

Step 300

The vehicle's doors are locked and the user 105 leaves the vehicle 100. The assumption that the user 105 leaves the vehicle 100 may be detected by using any suitable method. For example, in a keyless vehicle 100 where the user 105 is the driver, the vehicle 100 may detect the presence of a remote control representing a key inside the vehicle 100. A keyless vehicle 100 may be described as a vehicle 100 where a remote control (e.g. an electric remote control) may be used as a key to control access to the vehicle 100 and to start and stop the vehicle's engine instead of a traditional (e.g. mechanical) key. Thus, if the remote control is not present inside the vehicle 100, the driver 105 is presumed to have left the vehicle 100, considering the fact that the engine is off. In a vehicle 100 where a traditional (e.g. mechanical) key is used to control access and to start and stop the engine, the vehicle 100 detects that the user 105 presumably leaves when at least some of the following steps are performed: the engine is turned off, the key is removed, the door is opened, the door is closed and the locks are activated. These methods steps are the same that the vehicle 100 uses for shutting down the stereo or interior lights Additionally or alternatively, for instance if the user 105 is a passenger, one or more sensors may be used to detect the presence of the user 105 in the vehicle 100, e.g. a seat-embedded weight sensor and/or an interior camera.

Step 301

This step corresponds to step 202 in FIG. 2. The UE's and the vehicle's positions are determined.

Step 302

This step corresponds to step 203 in FIG. 2. The UE's and the vehicle's positions are compared in order to ensure presence of the UE 110 inside the vehicle 100.

Step 303

This step corresponds to step 204 in FIG. 2. In this step, it is checked whether or not the UE position and vehicle position match each other. If the positions match, indicated with "yes" in FIG. 3, the method proceeds to step 304. If there is a mismatch between the positions, indicated with "no" in FIG. 3, the method proceeds to step 305.

Step 304

This step is performed if the positions match, which means that the UE 110 has been left inside the vehicle 100. The user 105 is informed of that he has left the UE 110 inside the vehicle 100, e.g. by means of activation of the vehicle's horn signal and/or head lights or a combination thereof.

Step 305

This step is performed if the positions do not match, which means that the user 105 has taken the UE 110 with him when leaving the vehicle 100. The UE 110 is not left behind inside the vehicle 100.

The method for handling position of the UE 110 associated with the vehicle 100, according to some embodiments will now be described with reference to the flowchart depicted in FIG. 4. The method is performed by a system, and the system may for example be comprised in the vehicle 100. The method comprises at least some of the following steps, which steps may as well be carried out in another suitable order than described below.

Step 401

This step corresponds to step 202 in FIG. 2 and step 301 in FIG. 3. The system obtains the UE's 110 position and the vehicle's 100 position.

Step 402

This step corresponds to step 203 in FIG. 2 and step 302 in FIG. 3. The system compares the UE's 110 position with the vehicle's 100 position. The purpose of the comparison is to check to which degree the positions match.

Steps 401 and 402 may be summarized as determining the UE's position relative to the vehicle's position.

Step 403

This step corresponds to step 204 in FIG. 2 and step 303 in FIG. 3. The system determines a degree of match of the compared positions, e.g. whether they match or mismatch.

Step 404

This step corresponds to step 205 in FIG. 2 and step 304 in FIG. 3. The system informs the user 105 of the UE 110 of the degree of match.

The method for handling position of the UE 110 associated with the vehicle 100, according to some embodiments will now be described with reference to the flowchart depicted in FIG. 5. The method illustrated in FIG. 5 is a more detailed illustration of the method in FIG. 4. The method is performed by a system, and the system may for example be comprised in the vehicle 100. The method comprises at least some of the following steps, which steps may as well be carried out in another suitable order than described below.

Step 501

This step corresponds to step 201 in FIG. 2. The system may check if the UE 110 is connected to the vehicle 100 when the vehicle's 100 engine has been turned on (i.e. when the vehicle 100 is starting up) and before the vehicle 100 starts moving.

Step 502

Figure 4:
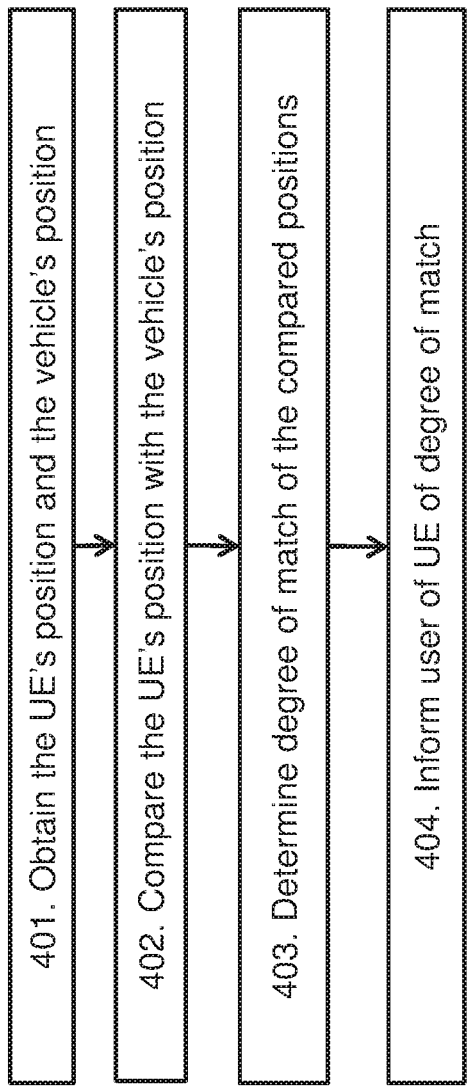
FIG. 4 is a flow chart illustrating embodiments of a method.
Figure 5:
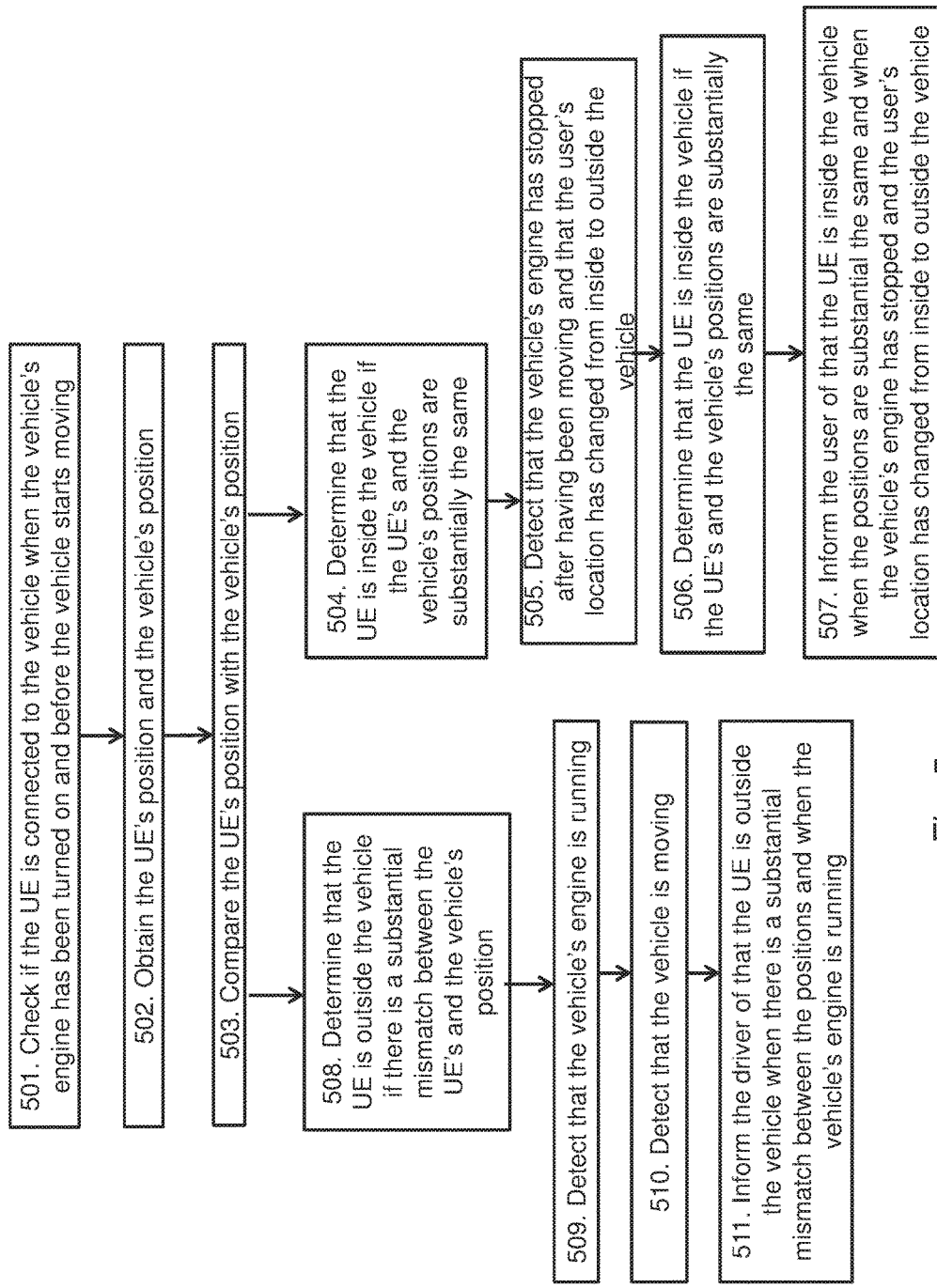
FIG. 5 is a flow chart illustrating embodiments of a method.

This step corresponds to step 202 in FIG. 2, step 301 in FIG. 3 and step 401 in FIG. 4. The system obtains the UE's 110 position and the vehicle's 100 position. The UE's 110 and the vehicle's 100 positions may be obtained when the UE 110 is connected to the vehicle 100.

The UE's 110 position may be obtained in at least one of the following scenarios:

when the vehicle's 100 engine is starting up and before the vehicle 100 starts moving, when the vehicle's 100 engine is running and when the vehicle 100 is moving, when the vehicle's 100 engine has stopped and the location of the user 105 has changed from being inside to being outside the vehicle 100.

How the system can detect that the user 105 has changed from being inside to being outside the vehicle 100 is described in more detail reference to step 300 above.

The UE's 110 position may be obtained by localizing the UE 110 by means of a communications network 115 based on an UE identity.

Step 503

This step corresponds to step 203 in FIG. 2, step 302 in FIG. 3 and step 402 in FIG. 4. The system compares the UE's 110 position with the vehicle's 100 position.

Step 504

This step corresponds to steps 204 and 206 in FIG. 2, and steps 303 and 304 in FIG. 3. This step may also be seen as a sub-step of step 403 in FIG. 4. The system may determine that the UE 110 is inside the vehicle 100 if the UE's 110 position substantially match the vehicle's 100 position, as a result of the comparison in step 503. In other words, if the UE's 110 position and the vehicle's position are substantially the same. There may be some tolerance with regards to the match, so the requirement may be described as the UE 110 being within the vehicle's circumference. Moreover, the expression "if" may throughout this disclosure refer to "when" and/or "provided that".

Step 505

This step corresponds to step 300 in FIG. 3. The system may detect that the vehicle's 100 engine has stopped after having been moving and that the user's 105 location has changed from being inside to being outside the vehicle 100.

Step 506

This step corresponds to steps 204 and 206 in FIG. 2, steps 303 and 304 in FIG. 3 and step 403 in FIG. 4. This step is the same as step 504 described above. The vehicle 100 may determine that the UE 110 is inside the vehicle 100 if the UE's 110 and the vehicle's 100 positions are substantially the same. Step 506 may be the second time this decision is taken. There may be some tolerance with regards to the match, so the requirement may be described as the UE 110 being within the vehicle's circumference.

Step 507

This step corresponds to step 304 in FIG. 3. This step may be seen as a sub'-step of step 404 in FIG. 4. The system may inform the user 105 of that the UE 110 is inside the vehicle 100 when the positions substantially match and when the vehicle's 100 engine has stopped and the user's 105 location has changed from being inside to being outside the vehicle 100. For example, after the user 105 has finished the drive, he leaves the vehicle 100 and leaves behind, for instance forgets, his UE 110 inside the vehicle 100. In such a scenario, the user 105 will be notified that he has left or forgotten the UE 110 inside the vehicle 100.

Step 508

This step corresponds to step 204 in FIG. 2 and step 305 in FIG. 3. This step may be seen as a sub-step of step 403 in FIG. 4. The system may determine that the UE 110 is outside the vehicle 100 if there is a substantial mismatch between the UE's 110 and the vehicle's 100 positions. There may be some tolerance with regards to the mismatch, so the requirement may be described as the UE 110 being outside the vehicle's circumference.

Step 509

This step corresponds to step 200 in FIG. 3. The system may detect that the vehicle's 100 engine is running.

Step 510

This step corresponds to step 200 in FIG. 3. The system may detect that the vehicle 100 is moving.

Step 511

This step corresponds to step 205 in FIG. 2. This step may be seen as a sub-step of step 404 in FIG. 4. The system may inform the UE's user 105 of that the UE 110 is outside the vehicle 100 when there is a substantial mismatch between the positions and when the vehicle's 100 engine is running. For example, the user 105 may have left behind, for instance forgotten, his UE 110 in his house.

Figure 6:
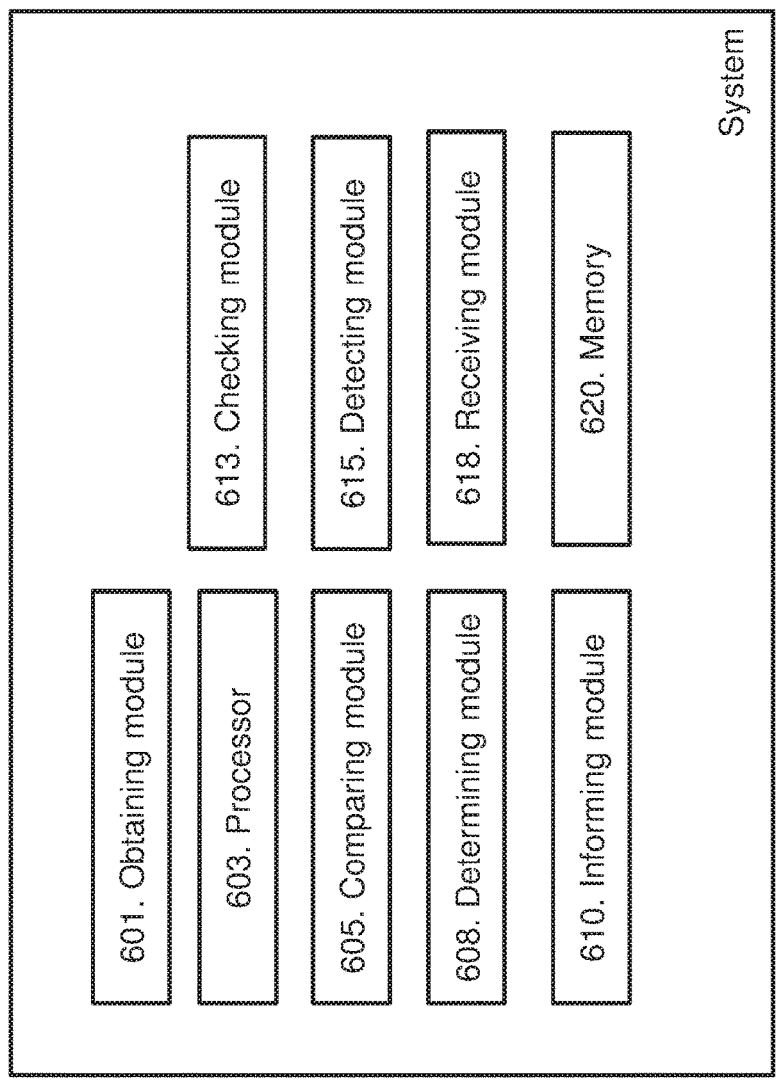
FIG. 6 is a schematic block diagram illustrating embodiments of a system.

To perform the method steps shown in FIGS. 2-5 for handling position of a UE 110 associated with the vehicle 100, the system (e.g. comprised in the vehicle 100) may comprise an arrangement as shown in FIG. 6.

The system is configured to, e.g. by means of an obtaining module 601, obtain the UE's 110 position and the vehicle's 100 position. The positions may be obtained in at least one of the following cases: when the vehicle's 100 engine is starting up and before the vehicle 100 starts moving, when the vehicle's 100 engine is running and when the vehicle 100 is moving, and when the vehicle's 100 engine has stopped and the user's 105 location has changed from being inside to being outside the vehicle 100. The UE's 110 position may be obtained by localizing the UE 110 by means of a communications network 115 based on at least one of a UE identity and a vehicle identity. The obtaining module 601 may also be referred to as an obtaining unit, an obtaining means, an obtaining circuit, means for obtaining etc. The obtaining module 601 may be a processor 603 of the system.

The system is configured to, e.g. by means of a comparing module 605, compare the UE's 110 position with the vehicle's 100 position. The comparing module 605 may also be referred to as a comparing unit, a comparing means, a comparing circuit, means for comparing etc. The comparing module 605 may be the processor 603 of the system.

The system is configured to, e.g. by means of a determining module 608 determine a degree of match of the compared positions. The determining module 608 may also be referred to as a determining unit, a determining means, a determining circuit, means for determining etc. The determining module 608 may be the processor 603 of the system.

The system is configured to, e.g. by means of an informing module 610, inform a user 105 of the UE 110 of the degree of match. The informing module 610 may also be referred to as an informing unit, an informing means, an informing circuit, means for informing, output unit, transmitting module etc. The informing module 610 may be a transmitter, a transceiver etc. The informing module 610 may be a wireless transmitter of the system comprised in the vehicle 100.

The system may be configured to, e.g. by means of the determining module 608, determine that the UE 110 is inside the vehicle 100 if the UE's 110 position substantially matches the vehicle's 100 position, i.e. that they are substantially the same.

The system may be configured to, e.g. by means of the determining module 608, determine that the UE 110 is outside the vehicle 100 if there is a substantial mismatch between the UE's 110 position and the vehicle's 100 position.

The system may be configured to, e.g. by means of the informing module 610, inform the UE's user 105 of that the UE 110 is outside the vehicle 100 when there is a substantial mismatch between the positions and when the vehicle's 110 engine is running.

The system may be configured to, e.g. by means of the informing module 610, inform the user 105 of that the UE 110 is inside the vehicle 100 when the positions substantially match and when the vehicle's 100 engine has stopped and the user's 105 location has changed from being inside to being outside the vehicle 100.

The system may be configured to, e.g. by means of a checking module 613, check if the UE 110 is connected to the vehicle 100 when the vehicle's 100 engine has been turned on and before the vehicle 100 starts moving. The UE's 110 and the vehicle's 100 positions may be obtained when the UE 110 is connected to the vehicle 100. The checking module 613 may also be referred to as a checking unit, a checking means, a checking circuit, means for checking etc. The checking module 613 may be the processor 603 of the system.

The system may be configured to, e.g. by means of a detecting module 615, detect that the vehicle's 100 engine has stopped after having been moving and that the user's 105 location has changed from being inside to being outside the vehicle 100. The detecting module 613 may also be referred to as a detecting unit, a detecting means, a detecting circuit, means for detecting etc. The detecting module 615 may be the processor 603 of the system.

The system may be configured to, e.g. by means of the detecting module 615, detect that the vehicle's 100 engine is running.

The system may be configured to, e.g. by means of the detecting module 615, detect that the vehicle 100 is moving.

The system may comprise a receiving module 618 configured to receive information such as e.g. position data from the communication network 115. The receiving module 618 may also be referred to as a receiving unit, a receiving means, a receiving circuit, means for receiving, input unit etc. The receiving module 618 may be a receiver, a transceiver etc. The receiving module 618 may be a wireless receiver of the system comprised in the vehicle 100.

In some embodiments, the system comprises the processor 603 and a memory 620. The memory 620 comprises instructions executable by the processor 603. The memory 620 is arranged to be used to store data, threshold values, time periods, configurations, schedulings, position data, connectivity information, UE identity, vehicle identity, engine status, user status, comparison information etc. and applications to perform the methods herein when being executed by the system.

Those skilled in the art will also appreciate that the obtaining module 601, the comparing module 605, the determining module 608, the informing module 610, the checking module 613, the detecting module 615 and the receiving module 618 described above may refer to a combination of analog and digital circuits, and/or one or more processors configured with software and/or firmware, e.g. stored in a memory, that when executed by the one or more processors such as the processor 603 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a computer program may comprise instructions which, when executed on at least one processor, cause the at least one processor to carry out at least some of the method steps in FIGS. 2, 3, 4 and/or 5. A carrier may comprise the computer program, and the carrier is one of an electronic signal, optical signal, radio signal or computer readable storage medium.

A vehicle 100 comprises the system as described in FIG. 6.

The present mechanism for handling position of a UE 110 associated with a vehicle 100 may be implemented through one or more processors, such as a processor 603 in the system arrangement depicted in FIG. 6, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the system. One such carrier may be in the form of a CD ROM disc. It is however feasible with other data carriers such as a memory stick. The computer program code can furthermore be provided as pure program code on a server and downloaded to the system.

With the embodiments herein, communication to the user 105 is done through the vehicle 100 and not via the UE 110. For instance, when the user's UE 110 is left somewhere, the user will be notified by the vehicle 100. So the UE 110 is not used for communication to the user 105 in the embodiments herein.

In the embodiments herein, the UE 110 needs to send its position and GPS information to the vehicle 100. The position and GPS information may be sent directly to the vehicle 100, or via the communications network 115 from which the vehicle 100 obtains the UE's position. In other words, it is not necessary for the vehicle 100 to send its position information to the UE 110.

The embodiments herein do not only remind the user 105 that the UE 110 is left somewhere, but it also addresses the exact place of the UE's position. The system reminds the user 105 if the UE 110 is left behind, and where it is left.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a system for handling a position of a User Equipment (UE) associated with a vehicle, the method comprising:
    obtaining the UE position and a position of the vehicle;
    comparing the UE position with the vehicle position;
    determining a degree of match of the compared UE and vehicle positions based on communication between the UE and the vehicle via a communication network; and
    informing a user of the UE of the degree of match, wherein informing the user of the degree of match comprises
        informing the user that the UE is outside the vehicle when the degree of match between the positions of the UE and the vehicle exceeds a tolerance and when an engine of the vehicle is running wherein informing the user that the UE is outside the vehicle comprises providing within the vehicle an audible indication via a speaker or a visible indication via a display, and
informing the user that the UE is inside the vehicle when the degree of match between the positions of the UE and the vehicle falls within the tolerance and when the engine of the vehicle has stopped and a location of the user has changed from being inside to being outside the vehicle, wherein informing the user that the UE is inside the vehicle comprises providing exterior to the vehicle an audible indication via a vehicle horn or a visible indication via a vehicle light.

2. The method according to claim 1 wherein the degree of match of the compared positions further comprises:
determining that the UE is inside the vehicle when the degree of match between the positions of the UE and the vehicle falls within the tolerance; and
determining that the UE is outside the vehicle when the degree of match between the positions of the UE and the vehicle exceeds the tolerance.

3. The method according to claim 1 further comprising:
checking if the UE is connected to the vehicle when the vehicle's engine has been turned on and before the vehicle starts moving, and
wherein the UE's and the vehicle's positions are obtained when the UE is connected to the vehicle.

4. The method according to claim 1 further comprising:
detecting that the vehicle's engine has stopped after having been moving and that the user's location has changed from being inside to being outside the vehicle.

5. The method according to claim 1 further comprising at least one of:
detecting that the vehicle's engine is running; and
detecting that the vehicle is moving.

6. The method according to claim 1 wherein the UE's position is obtained when at least one of the following is performed:
when the vehicle's engine is starting up and before the vehicle starts moving,
when the vehicle's engine is running and when the vehicle is moving, and
when the vehicle's engine has stopped and the location of the user has changed from being inside to being outside the vehicle.

7. The method according to claim 1 wherein the UE's position is obtained by localizing the UE by means of a communications network based on at least one of an UE identity and a vehicle identity.

8. A system for handling a position of a User Equipment (UE) associated with the vehicle, the system configured to:
obtain the UE position and a position of the vehicle;
compare the UE position with the vehicle position;
determine a degree of match of the compared UE and vehicle positions based on communication between the UE and the vehicle via a communication network; and
inform a user of the UE of the degree of match, wherein inform the user of the degree of match comprises
inform the user that the UE is outside the vehicle when the degree of match between the positions of the UE and the vehicle exceeds a tolerance and when an engine of the vehicle is running, wherein inform the user that the UE is outside the vehicle comprises provide within the vehicle an audible indication via a speaker or visible indication via a display, and
inform the user that the UE is inside the vehicle when the degree of match between the positions of the UE and the vehicle falls within the tolerance and when the engine of the vehicle has stopped and a location of the user has changed from being inside to being outside the vehicle, wherein inform the user that the UE is inside the vehicle comprises provide exterior to the vehicle an audible indication via a vehicle horn or visible indication via a vehicle light.

9. The system according to claim 8 further configured to:
determine that the UE is inside the vehicle when the degree of match between the positions of the UE and the vehicle falls within the tolerance; and to
determine that the UE is outside the vehicle when the degree of match between the positions of the UE and the vehicle exceeds the tolerance.

10. The system according to claim 8 further configured to:
check if the UE is connected to the vehicle when the vehicle's engine has been turned on and before the vehicle starts moving, and
wherein the UE's and the vehicle's positions are obtained when the UE is connected to the vehicle.

11. The system according to claim 8 further configured to:
detect that the vehicle's engine has stopped after having been moving and that the user's location has changed from being inside to being outside the vehicle.

12. The system according to claim 8 configured to at least one of:
detect that the vehicle's engine is running; and
detect that the vehicle is moving.

13. A vehicle comprising the system according to claim 8.

14. A system for handling position of a User Equipment (UE) associated with the vehicle, the system comprising:
circuitry configured to obtain a position of the UE position and a position of the vehicle, compare the UE position with the vehicle position, determine a degree of match of the compared UE and vehicle positions based on communication between the UE and the vehicle via a communication network, and inform a user of the UE of the degree of match;
wherein inform the user of the degree of match comprises
inform the user that the UE is outside the vehicle when the degree of match between the positions of the UE and the vehicle exceeds a tolerance and when an engine of the vehicle is running, wherein inform the user that the UE is outside the vehicle comprises provide within the vehicle an audible indication via a speaker or visible indication via a display, and
inform the user that the UTE is inside the vehicle when the degree of match between the positions of the UE and the vehicle falls within the tolerance and when the engine of the vehicle has stopped and a location of the user has changed from being inside to being outside the vehicle, wherein inform the user that the UE is inside the vehicle comprises provide exterior to the vehicle an audible indication via a vehicle horn or visible indication via a vehicle light.

* * * * *